3,536,558

INVENTOR.
Morton S. Lipkins

BY
Paul S. Martin
Attorney

United States Patent Office 3,536,558
Patented Oct. 27, 1970

3,536,558
FABRICATION OF OPTICAL TUNNELS
Morton S. Lipkins, 3 Nemeth St.,
Malverne, N.Y. 11565
Filed Dec. 27, 1966, Ser. No. 604,668
Int. Cl. C03b *11/00;* G02b *5/14*
U.S. Cl. 156—296                                        9 Claims

ABSTRACT OF THE DISCLOSURE

The fabrication of an optical tunnel having four walls is carried out using four plates, each plate having an optically flat face and a joint-forming face at right angles. The process includes a preliminary operation of cementing the joint-forming face of one plate to the optically flat face of a second plate at a position determined by pressing another plate against the joint-forming face of the second plate and pressing the first plate and the other plate toward each other but separated by duplicate gauge balls near the opposite ends of the assembled plates. In one procedure, a third plate is assembled to a fourth plate in the same manner, and the two joined pairs of plates are assembled and cemented to each other using the gauge balls. In another procedure, the joint-forming face of a third plate is joined to the optically flat face of one of the first two previously assembled plates, using the gauge balls as before, and then a fourth plate is cemented in place to complete the optical tunnel. Foil of uniform thickness is interposed as protection between the gauge balls and the optically flat faces. The plates are metallized before being assembled, for assuring uniform metallic reflecting surfaces.

---

Optical tunnels have been known and used for various purposes. A square optical tunnel used in an image-multiplying system is described in "The Optical Tunnel—A Versatile Electro-Optical Tool" by L. J. Krolak and D. J. Parker at pp. 177–180 of the March 1963 issue of the Journal of the SMPTE, vol. 7. See also Pat. 3,170,980 issued Feb. 3, 1965 to D. E. Pritchard.

A high degree of accuracy of such tunnels is essential to their performance. The opposite walls of square tunnels must be accurately parallel and the adjacent walls must be accurately right-angled, for realizing the desired performance. Heretofore the methods used for achieving the desired results have been tedious, exacting and costly in terms of time required of skilled optical technicians.

The application of the present invention to the fabrication of a square tunnel will be understood from the examples described below and shown in the accompanying drawings. Briefly these examples involve preliminary assembly and uniting of two adjacent plates, each having an accurately formed reflecting face and an accurately right-angled joint-forming face. In the preliminary assembly operation, the joint-forming face of a first plate is placed on the reflecting face of a second plate, an additional plate is held against the joint-forming face of the second plate, and matched spheres are used with surface-protecting foils as gauging means at the respective ends of the assembly, between the reflecting surface of a first plate and the flat face of said other plate. Duplicate gauging means are used at the ends of the assembly in this operation; and preferably the same gauging means is used in the subsequent operations as detailed below in establishing the dimensions of the other walls formed of additional plates similarly assembled and oriented.

Figure 1:
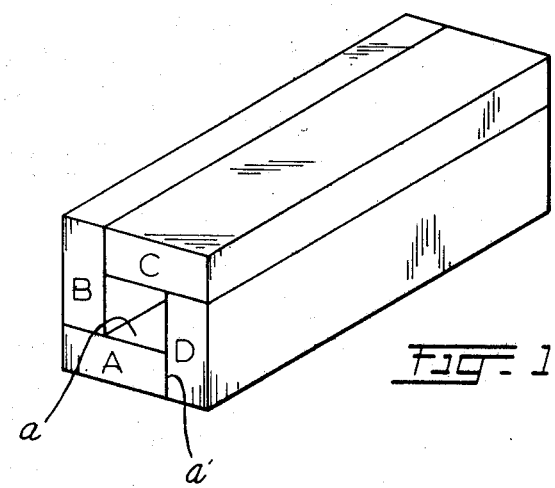
FIG. 1 is a perspective of an optical tunnel.

The optical tunnel of FIG. 1 has a square passage whose reflecting walls are optically flat and aluminized. The tunnel is built up of four glass plates A, B, C and D, each of which has an optically flat aluminized face (e.g. face *a*) and a joint-forming edge (e.g. face *a'* of plate A) at right angles to the optically flat face. In the case of a square tunnel, the angle at the corners of the passage are the same as the angle between the aluminized face and the joint-forming face of each plate. Each joint-forming face is also accurately flat, but it may be called "largely" flat since it includes some form of relief for containing cement. The relief may be a chamber along the external edge of the joint-forming face, or one or more recesses within its outline.

Figure 2:
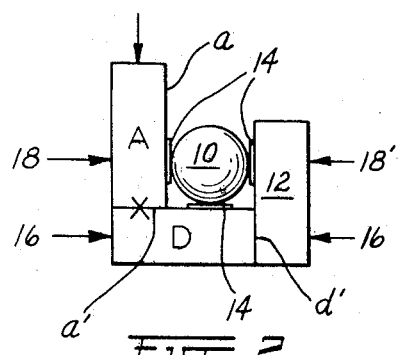
FIG. 2 is an end view illustrating a first assembly step in the manufacture of the optical tunnel.
Figure 3:
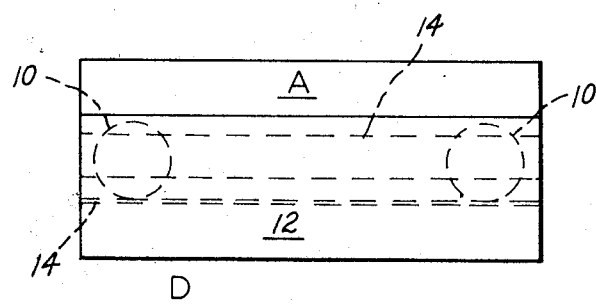
FIG. 3 is an elevation of the parts in FIG. 2, as viewed from the right.

FIG. 2 shows a first step in the assembling process. For example, plate D has its joint-forming face clamped against an optically flat face of a plate 12, pressure being applied as represented by arrows 16. Plate A is then butted against plate D at interface X. The placement is not the final one, but only a close approximation. Preferably, thin sheets of aluminum or other ductile foil are applied to the aluminized faces of plates A and D, and to the inside exposed face of plate 12. Spherical gauging spheres 10 of accurately matched diameters, or duplicate short cylinders, are interposed between plates A and 12 near the assembled ends thereof. While some downward pressure is applied to plate A for keeping it firmly in face contact with plate D, a standardized pressure is applied at arrow 18 toward plate 12 while a resisting force 18' is applied to plate 12. At the proper time, cement is applied to the recess or recesses in face *a'* (before or after the assembly of plate A to plate D, depending on the location of the cement-forming recesses) and after the cement has set the pressures can be released. The result of this operation is the accurate location of the joint-forming face *d'* of plate D parallel to reflecting face *a* and at an accurately controlled distance therefrom equalling a wall of the tunnel.

Figure 4:
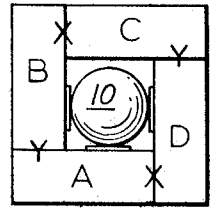
FIG. 4 is an end view showing the final assembly step in the manufacture of an optical tunnel.

The operation illustrated in FIG. 2 is repeated with two more plates C and D. The two right-angled couples A–B and C–D mechanically held in assembly or having joints X held by cement are then assembled (FIG. 4) about spheres 10 adjacent the extremities. The spheres rest on pieces of foil of the same uniform-thickness as was used initially and with pieces of foil at opposite sides of the spheres 10. The same standardized pressure is applied horizontally as was used initially, and joints Y are then formed with appropriately applied cement. The balls 10 are then withdrawn, the foils removed, and the tunnel is complete as is shown in FIG. 1.

Figure 5:
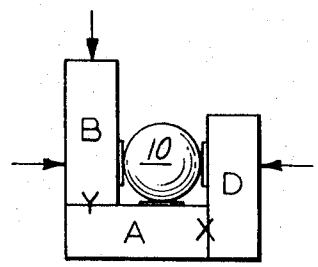
FIG. 5 is an intermediate step in a modified method of assembly of the optical tunnel of FIG. 1.

A modified procedure may be followed if desired, as represented in FIG. 5. The joint X is first completed between plates A and D in the manner described in connection with FIG. 2. Plate B is then assembled to plate A. Pressure is applied to plate B downward and laterally (as is applied to plate A, FIG. 1) so as to form joint Y. Thereafter plate C is cemented in place, to complete the accurately square tunnel. This procedure has the advantage of involving but two gauge-controlled steps of assembly in completing the tunnel.

The gauging means used in the foregoing assembly operations includes matched spheres plus uniform-thickness pieces of foil. The use of the foil is desirable for avoiding possible marking of the aluminized faces which might result otherwise from use of the spheres without the foil. The spheres are readily obtained to a high degree of perfection as to matched diameters and sphericity, and foil of uniform thickness is also readily available. The foil is ductile in contrast to the spheres which are characteristically hard. The foil acts to reduce the danger of damage to the reflecting surfaces.

Operations paralleling those above can be carried out for assembling tunnels having different numbers of reflecting walls. Other changes may be introduced, as will be apparent to those skilled in the art. Consequently the invention should be construed broadly in accordance with its full spirit and scope.

What is claimed is:

1. The method of forming an optical tunnel having parallel-edged walls of equal widths and wherein the corner angles between adjoining walls are equal, including the steps of forming plural plates each having an optically flat face and a transverse joint-forming largely flat face at an angle thereto that is the complement of said equal corner angles, assembling a pair of said plates with the joint-forming face of a first one of said plates against the optically flat face of a second one of said plates and with another optically flat plate across the joint-forming face of said second plate, and orienting said first and second plates relative to each other by interposing gauging means comprising a member of circular cross-section between said first plate and said other plate adjacent one end of the assembled plates and interposing a duplicate gauging means between said first plate and the other plate adjacent the opposite end of the assembled plates, and cementing said assembled pair of plates to each other while pressing said first plate toward said other plate to the extent limited by said gauging means and while holding said other plate against said joint-forming face of said second plate, and assembling and cementing an additional one of said plural plates to said first and second plates while orienting said additional plate relative to the assembled first and second plates using duplicate gauging means including said members of equal diameter as aforesaid interposed and pressed between the ends of the additional plate and the opposite one of said previously assembled first and second plates.

2. The method of forming an optical tunnel as set forth in claim 1, wherein said angle between said optically flat face and said transverse face of each of said plural plates is a right angle and wherein said additional plate and a fourth one of said plates are assembled and oriented pursuant to the steps set forth in relation to the first and second plates before said additional plate is assembled and oriented relative to the first and second plates as aforesaid.

3. The method set forth in claim 1 wherein said members of equal diameter are relatively hard, including the step of interposing relatively ductile pieces of foil, all of the same uniform thickness, between each of said members of equal diameter and each optically flat face of a respective one of said plural plates that is pressed toward said gauging means.

4. The method in accordance with claim 2 wherein said members are spheres.

5. The method set forth in claim 1 wherein said members of equal diameter are spheres, and wherein pieces of foil all of the same uniform thickness are interposed between each sphere and each face of a respective plate that is pressed toward such sphere.

6. The method set forth in claim 1, wherein said angle between said optically flat face and said transverse face of each of said plural plates is a right angle, and wherein a fourth one of said plates is assembled and cemented to the optically flat face of said additional plate and to the joint-forming face of one of said pair of plates after the aforesaid assembly and cementing of said additional plate to the first and second assembled plates.

7. The method in accordance with claim 6, wherein the optically flat face of each of said plates is metallized prior to assembly of the plates as aforesaid.

8. The method set forth in claim 3, wherein the optically flat face of each of said plates is metallized prior to assembly of the plates as aforesaid.

9. The method set forth in claim 1, wherein said members of equal diameter are spheres, and wherein pieces of foil all of the same uniform thickness are interposed between each sphere and each face of a respective plate that is pressed toward such sphere, and wherein said optically flat faces are metallized prior to assembly of said plates.

References Cited

UNITED STATES PATENTS

| | | | |
|---|---|---|---|
| 1,888,341 | 11/1932 | Winckler. | |
| 2,604,426 | 7/1952 | Beekman | 156—182 |
| 3,170,980 | 2/1965 | Pritchard. | |
| 3,347,649 | 10/1967 | Singer | 65—38 |

ROBERT F. STAHL, Primary Examiner

U.S. Cl. X.R.

65—38; 156—297; 350—96, 320